United States Patent [19]

Krüger

[11] 4,403,321

[45] Sep. 6, 1983

[54] SWITCHING NETWORK

[75] Inventor: Johann Krüger, Quickborn, Fed. Rep. of Germany

[73] Assignee: U.S. Philips Corporation, New York, N.Y.

[21] Appl. No.: 254,569

[22] Filed: Apr. 15, 1981

[30] Foreign Application Priority Data

Jun. 14, 1980 [DE] Fed. Rep. of Germany ....... 3022497

[51] Int. Cl.$^3$ ............................................ H04Q 11/04
[52] U.S. Cl. ......................................... 370/56; 370/67
[58] Field of Search ............................ 370/56, 67, 58; 179/18 FC

[56] References Cited

U.S. PATENT DOCUMENTS

| | | | |
|---|---|---|---|
| 3,521,000 | 7/1970 | Feder | 370/56 |
| 3,522,381 | 7/1970 | Feder | 370/56 |
| 3,728,492 | 4/1973 | Cappetti et al. | 370/56 |
| 4,253,179 | 2/1981 | Shimizu | 370/67 |

Primary Examiner—Douglas W. Olms
Attorney, Agent, or Firm—William J. Streeter

[57] ABSTRACT

A switching network used to connect a number of input lines to a number of output lines via an internal time-division multiplex line. A memory and a counter for repeatedly and cyclically addressing all the memory locations is provided. An output line which is connected to the internal time-division multiplex line by means of an address decoder, the address decoders being connected to the counter, is assigned to each memory location. The memory receives in each memory location the number assigned to an input line, the output of the memory being connected to each one of the number decoders for each input line, which each time decodes a different number. As a result thereof, after reading of an address, an output line is switched by an address decoder, is connected to the internal time-division multiplex line, this time-division multiplex line being connected to the input line via the number decoder which corresponds to the number stored in this location. When the switching network is used as a concentrator, the input lines, the subscriber's lines and the output lines are preferably the connections to the service modules of a subscriber's station in a remote time-division multiplex transmission system. The switching network is to a large extent of a modular construction and can therefore be easily extended.

9 Claims, 3 Drawing Figures

SWITCHING NETWORK

The invention relates to a switching network particularly for use as a concentrator for optionally connecting a number of channel modules to each time one subscriber's module out of a larger number of subscriber's modules via an internal time-division multiplex line which interconnects all channel modules and all subscriber's modules.

BACKGROUND OF THE INVENTION

Such a switching network is used in central exchanges, particularly in telephone central exchanges, to form connections between several subscribers. As it is usually assumed that only a certain portion of the connected subscribers are simultaneously busy, a concentrator is connected between the subscribers and the actual exchange, this concentration also comprises a switching network.

A space-division switching network comprises a plurality of switches which are layed out as a matrix and located at crosspoints of line and column conductors which are connected to the input and the outputs, respectively, the relevant crosspoint switch being closed to effect a desired connection. Such a switching network must indeed only switch low-frequency signals but its construction is nevertheless quite complicated. With a time-division switching network the inputs are cyclically scanned and read at different instants via a time-division multiplex line. Generally, only one single time-division multiplex output is then available.

With a concentrator in particular, a number of subscribers lines is concentrated at a considerably lower number of output lines, which are only then connected to the actual exchange to make a highest possible efficient use of this exchange. The concentrator must be of as simple a construction as possible, to save indeed cost and design effort.

OBJECT OF THE INVENTION

The invention has for its object to provide a switching network of the kind described above which can connect a plurality of input lines to a plurality of output lines at the lowest possible cost, wherein furthermore a modular construction must be achieved, which requires only little initial cost and effort and which can be easily extended to additional lines, the total cost increasing approximately linearly with the number of lines.

SUMMARY OF THE INVENTION

According to the invention, this object is accomplished in that a memory is provided having a number of memory locations at least equal to the number of channel modules, each channel module having one single memory location fixedly assigned to it, that an addressing device addresses in a cyclic sequence and repeatedly all the memory locations and connects in parallel therewith each assigned channel module to the internal time-division multiplex line, the address cycle being equal to the sampling period of the signals of the subscriber's modules, that the output of the memory is connected in parallel to each one of the number decoders for each subscriber's module which decode the numbers which are different for different subscriber's modules, a number decoder which decodes its number connecting the associated subscriber's module to the internal time-division multiplex line, and that in order to establish a connection between a subscriber's module and a channel module a control arrangement enters the number of the number decoder associated with the subscriber's module into the memory location assigned to this channel module.

When these measures of the invention are used little cost and effort are required, namely as the basic cost for the memory and the addressing device, while each connected line requires a channel module or a subscriber's module, which in principle only comprises switches, each switch being controlled via a decoder.

In order to realize that a call from a subscriber which is not yet busy can be recognized in a simple way and to build up a connection on the basis thereof, it is efficient for the number of memory locations to be at least 1 higher than the number of channel modules, that each subscriber's module has a call signal output which is switched by the associated number decoder, that all the call signal outputs are interconnected via the internal time-division multiplex line and connected to the control arrangement, and that the control arrangement sequentially enters the numbers of at least the unoccupied subscriber's module, in several address cycles, into the memory location to which no channel module has been assigned and tests the internal time-division multiplex line for a call signal during reading of this memory location.

For a simple control it is useful that the control arrangement enters a number into the memory locations to which no connection has been assigned, this number not being decoded by an available number decoder. As a result thereof a connection which is not available is treated as a connection having a non-available subscriber's line, so that in this case the control proceeds in a completely similar way as for a switched-through connection.

In a particularly simple implementation the addressing device is a cyclic binary counter. Such counters are of a simple construction and may generally be directly connected to the address inputs of conventional memories by means of their outputs.

The use of the internal time-division multiplex line accomplishes that only one sampling value of the signal to be transmitted is transmitted from each subscriber's module or channel module in each addressing cycle. Generally these sampling values are not transmitted in the analog mode, but digitally, as an analog-to-digital converter, which each time produces a multi-bit code word for a parallel or a serial transmission, or a delta-modulator is arranged between the subscriber's module and the subscriber, the output signals of the converter or the delta-modulator always being transmitted serially. Efficiently, the address device applies in each address cycle a clock signal to at least all the subscriber's modules via a clock line to synchronise sampling of these modules. Thus, a synchronisation of the analog-to-digital conversion and sampling at the subscriber's module can be done in the internal rhythm of the switching network.

When a binary counter is used as the addressing device, this rhythm can be derived in a particularly easy way from the output having the highest value or from the transmission signal.

The addresses within the address cycle appear at a very high rate. As the clock signal has a lower frequency according as an address cycle is longer, slower acting switching may be used in the channel modules and the subscriber's modules. In order to ensure that these circuits have been put into stable operation (after a clock signal) before the appearance of the first address of a cycle, it is efficient to have the addressing device interrupt the addressing of the channel modules and the subscriber's modules during a predetermined moment at each clock signal.

BRIEF DESCRIPTION OF THE DRAWINGS

Embodiments of the invention will now be described in detail with reference to the accompanying drawing, in which.

DETAILED DESCRIPTION OF THE PREFERRED EMBODIMENT

Figure 1:
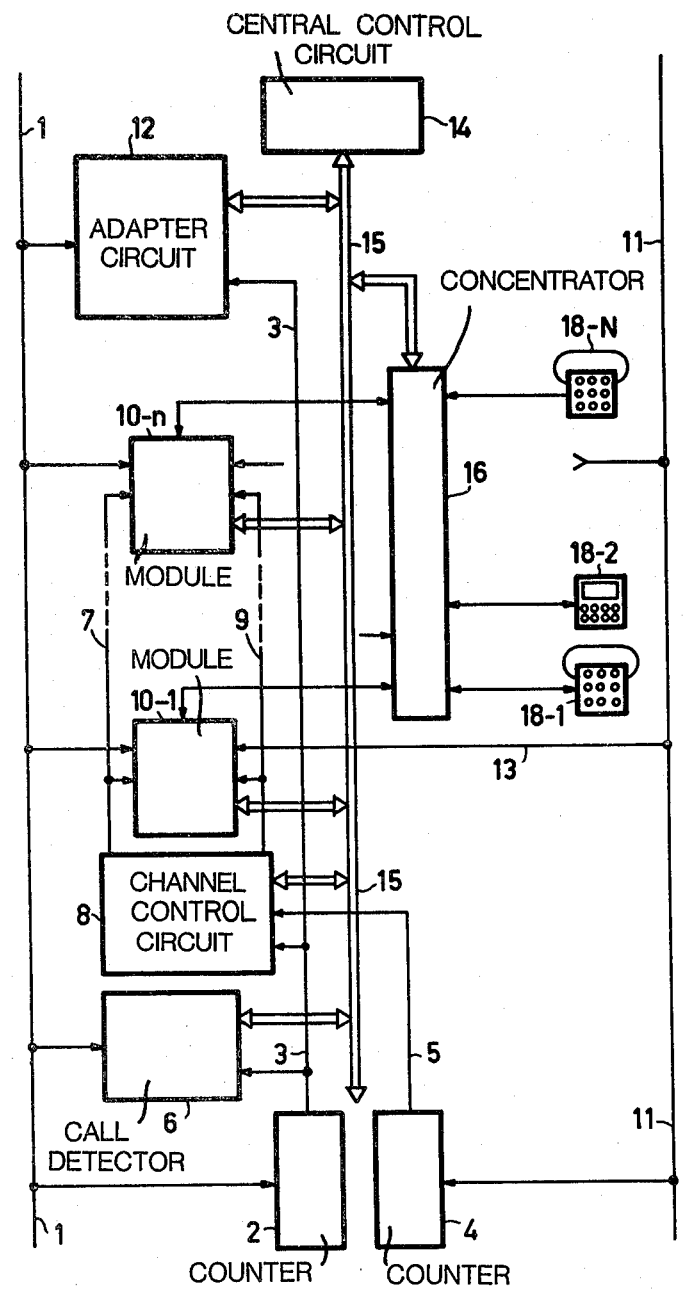
FIG. 1 shows an exchange for decentralised switching for the connection to a high-speed time-division multiplex line.

In FIG. 1 the subscriber's station shown there is connected to a time-division multiplex line 1 at the receiving end and to a time-division multiplex line 11 at the transmitting end, which connect this subscriber's station to other subscriber's stations. Each time-division multiplex line carries a signal having a predetermined, large, number of individual time-interlaced channels. For the synchronisation of the subscriber's stations with these channels a time period counter 2 and 4, respectively, is connected to each one of the two time-division multiplex lines 1 and 11, the position of this counter indicating from which channel at a given moment the signals on the time-division multiplex lines 1 and 11, respectively are available.

In addition, a call detector 6 which detects in a channel a signal combination which defines a call and which stores the channel number released by the time period counter 2 via the output 3 is connected to the time-division multiplex line 1. A control circuit 14 in the form of, for example, a computer, interrogates the call detector 6 and the channel number stored therein, respectively, via the bus line 15, and subsequently takes over the information in this channel via the adaptor circuit 12 to evaluate the call and to build up the associated connection.

The connection between the time-division multiplex line 1 and 11, respectively, and the subscriber's sets 18-1, 18-2 to 18-N are made via the so-called service modules 10-1 to 10-n, which are controlled by a channel control arrangement 8. This channel control circuit 8 comprises, for example, a memory which is controlled by the channel numbers on the output line 3 of the time period counter 2 and at the transmitting end by the channel numbers on the output line 5 of the time period counter 4, respectively. In a memory location which is associated with one channel of the time-division multiplex signal on the time-division multiplex line 1, which channel must be connected to a subscriber of this subscriber's station, this memory contains the addresses of a service module which are all supplied in parallel via the line 7 and, at the transmitter end, via the line 9, respectively, each service module comprising a decoder for its number at both the transmitting end and the receiving end. When a decoder responds, the time-division multiplex line 1 and 11, respectively, is connected in this channel to the corresponding subscriber's line via matching circuits.

An outgoing call from a subscriber is received in a service module 10-1 to 10-n connected to this subscriber and is recognized and evaluated in this service module by the central control arrangement 14 via the line 15 by periodic interrogation of all the service modules. Thereafter the control circuit 14 effects the transmission of the call code with the address of the calling and of the called subscriber via the relevant service module. The exact functions are not essential for the present invention and are therefore not further described.

As the service modules 10-1 to 10-n are a certain cost factor and on the other hand the subscribers are occupied for only a fraction of the total time, a concentrator 16 which is here connected between the individual subscribers 18-1, 18-2 to 18-N and the service modules 10-1 to 10-n is provided in known manner. This concentrator is controlled by the control circuit 14 via the multiple line 15; this control and the construction of the concentrator 16 of the invention will now be further explained with reference to FIG. 2.

Figure 2:
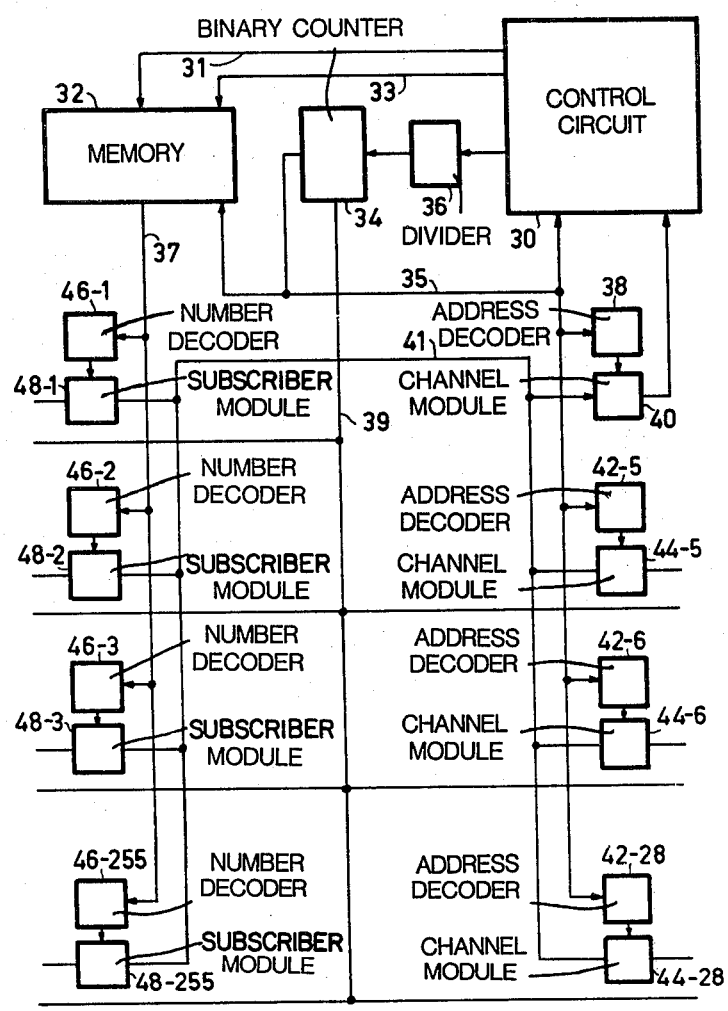
FIG. 2 shows a switching network of the invention used in the exchange of FIG. 1.

In this FIG. 2 the individual subscribers are connected to an internal time-division multiplex line 41 via subscriber's modules 48-1, 48-2 to 48-255. It is assumed that any signal conversion and formating have already been previously effected, so that the subscriber's module must only transmit serial data and that it may therefore have been implemented with switches or switched-mode amplifiers.

Figure 3:
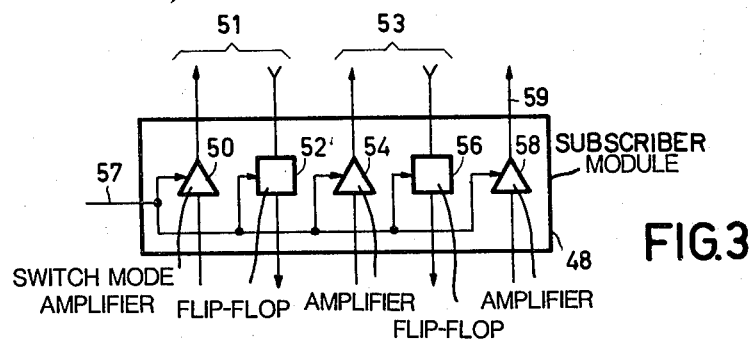
FIG. 3 shows schematically the structure of a subscriber's module.

FIG. 3 shows a possible construction of a subscriber's module 48. This embodiment shows 5 lines, which lead to the subscriber and the internal time-division multiplex line 41 has here therefore also 5 lines. The two lines 51 include the data lines which are separated for both directions, the two lines 53 represent the signaling lines and the output 59 is activated when a call is required, that is to say in the off-hook condition.

At the data lines 51 the line leading from the subscriber to the internal time-division multiplex line 41 comprises a switched-mode amplifier 50, which is made operative or blocked by means of a signal at the input 57. The line leading from the internal time-division multiplex line 41 to the subscriber includes a D-flip-flop which takes over the information coming from the internal time-division multiplex line 41 together with a signal at the input 57 and applies it to the subscriber. The elements 54 and 56 in the signaling lines 53 operate in the same manner. Only one switched-mode amplifier 58 is included in the call line as there is no return line for it. Consequently, the internal time-division multiplex line 41 comprises 5 single lines.

The above-described example represents only one possibility as it is, for example, alternatively possible that the data and the signaling sign are transmitted over a pair of lines or also over one line for both directions. The line for the call outputs 59 may alternatively be a separate line as it is not connected to the channel modules, as will be explained hereinafter.

The input 57 of each subscriber's module 48 is driven from an associated number decoder 46, that is to say the subscriber's module 48-1 is driven by the number decoder 46-1, etc. The number decoders 46-1 to 46-255 are connected in parallel to the data output 37 of a memory 32, which here consists indeed also of several individual parallel data lines for the transmission of each time a multi-bit code word. So 256 different code combinations and numbers, respectively, are possible for 8 parallel data lines and each number is decoded by one one of the number decoders 46-1 to 46-255, so that a number is assigned to each subscriber and one subscriber is assigned to each number, respectively.

The internal time-division multiplex line 41 is further connected to a number of channel modules 44-5 to 44-28. These modules are also constructed in the manner shown in FIG. 3, only the call line and the associated switched-mode amplifier 58 having been omitted. Each channel module 44 is connected in a corresponding manner as for the subscriber's modules to an address decoder 42, that is to say the channel module 44-5 is connected to the address decoder 42-5, etc. The inputs of the address decoder 42 are connected in parallel to the output of a binary counter 34 via the multiple line 35, a different address decoder responding to each counter position. For some addresses there is, however, no address decoder, as will be explained hereinafter.

In addition, a module 40 has been provided which is only connected to the call line of the internal time-division multiplex line 41, which call line interconnects the outputs 59 of the subscriber's module 48, the signal of this module being applied to a control arrangement 30 when the address decoder 38, which excites the module 40 and which is also connected to the address line 35 receives and decodes its associated address. The outputs of the channel module 44 are connected to the corresponding multiple input of a fixedly assigned service module 10-1 to 10-n, n here having the value 24.

The memory 32 is also connected by means of its address input to the address line 35, which is connected to the output of the counter 34. Via a divide-by-two divider 36 this counter receives here a clock signal having the frequency of the word rhythm on the external multiplex lines 1 and 11, respectively, of FIG. 1. As this clock signal is permanently present, the counter 34 always passes through all its positions one after the other, and for each position the corresponding memory location in the memory 32 is read, and for a portion of the positions, namely the position of the decimal designations 5–28, a channel module 44 is each time switched through, which connects the internal time-division multiplex line 41 to a service module 10 of FIG. 1, assigned to the channel module.

Each memory location of the memory 32 comprises 8 bits which represent a number. As no number decoder 46 has been provided for the number 0, this number is contained in the memory location to whose address no channel module has been assigned or to whose channel module no connection has been assigned. When, however, there is a different number in an address, then, when the counter 34 reaches this address, the relevant service module is connected via the channel module 44 associated with this address to the internal time-division multiplex line 41, which is simultaneously connected to the relevant subscriber via the subscriber's module associated with the number contained in the address. In this way a subscriber is connected to a predetermined service module 10 of FIG. 1 in each address cycle. Writing the number in the memory 32 is effected by the control arrangement 30, which may be part of the central control circuit 14 in FIG. 1 or may be controlled by this central control circuit. To this end the control arrangement 30 applies via the line 31 the bit combination which corresponds with the number to be entered of the desired subscriber to the data input of the memory 32 and via the line 33 the memory 32 is temporarily switched from reading to writing. This is effected at the address assigned to the channel module 44 or to the service module 10 through which the connection should be made. To this end the control arrangement 30 is also connected to the address multiple line 35. Alternatively, it is possible to supply the write addresses via the line 33 when the memory 32 can simultaneously write and read at different addresses.

Writing a number into the memory 32 forms part of the build-up of a connection. An incoming call is then evaluated by the central control circuit 14, as was explained with reference to FIG. 1. The number to be entered is therefore determined by the address of the called subscriber, while the address into which this number is written is defined by any optional channel module and service module. A call going out from a connected subscriber must first be evaluated. To this end the control arrangement 30 enters the number of a subscriber which is not engaged into an address of the memory 32 to which address no channel module 44 but the module 40 has been assigned, the address 0 preferably being used for this purpose. As soon as this address is read, the call request of this subscriber is applied to the control arrangement 30 via the output 59 of the associated subscriber's module 48, the internal time-division multiplex line 41 and the module 40. When there is a call request, the control arrangement 30 writes thereafter this number into an address of the memory 32 which has been assigned to a channel module which is not engaged and the further connection is established via the associated service module under the control of the central control arrangement 14.

When, on the contrary, there is no call request, another number is written into the address 0 in the next or in one of the next address cycles and the subscriber to which this number belongs is interrogated for his call request, etc. With a predescribed minimum response time of, for example, 70 ms there may be a large number of address cycles in which no interrogation is effected between each interrogation of a subscriber, to relieve the internal control.

In each address cycle a connected subscriber receives a signal bit and simultaneously releases a signal bit, when separate lines are used for both directions. In order to synchronise processing of these bits in the further subscriber's circuits with the internal through-connection a clock signal which is derived from the address cycle is applied to all subscribers and, for the sake of simplicity, also to all the service modules. This is realised by the binary counter 34 by means of the output line 39, for which, for the sake of simplicity the most significant output or the transmission output may be used, so that the clock signal is produced on the line 39 at the address 0. As this clock signal can trigger several processes in the subscriber's circuits, it is not possible that immediately thereafter the subscriber's module 48 is switched through. For this reason a channel module is first assigned to the decimal address 5, namely the channel module 44-5, and a subscriber which is connected to this channel module by means of a corresponding connection built-up, is therefore not interrogated until at the earliest a period of time corresponding to 5 addresses after the clock signal on the line 39. With a word rhythm on the external time-division multiplex line 1 and 11, respectively, having a frequency of 4.096 MHz a binary counter 34 having 5 bits, that is to say 32 positions, produces, taking divider 36 into consideration, a clock signal on the line 39 with a frequency of 64 kHz. The time between this clock signal and the earliest sampling operation amounts, therefore, to 2.5 $\mu$s, which must absolutely be sufficient. As a protection from clock signal instabilities no channel modules have been assigned to the last three addresses of the address cycle, but the address 28 is assigned to the last channel module.

Similarly to the subscriber's station shown in FIG. 1 the switching network shown in FIG. 2 may be of a modular construction, that is to say the basic structure need not include all the service modules 10 of FIG. 1 and the corresponding channel modules of FIG. 2 and likewise not all the subscriber's modules 48 of FIG. 2. As a result thereof, the system can be easily adapted to a growing amount of traffic to be handled.

What is claimed is:

1. A switching network for optionally connecting a number of channel modules to each one of a subscriber's module out of a larger number of subscriber's modules and number decoder modules via an internal time-division multiplex line which forms an interconnection between all the channel modules and all the subscriber's modules, particularly for use as a concentrator, characterized in that a memory is provided having a number of memory locations at least equal to the number of channel modules, each channel module having one single memory location fixedly assigned to it, that an addressing device addresses in a cyclic sequence and repeatedly all the memory locations and connects in parallel therewith each assigned channel module to the internal time-division multiplex line, the address cycle being equal to the sampling period of the signals of the subscriber's modules, that the output of the memory is connected in parallel to each one of the number decoders for each subscriber's module which decodes the numbers which are different for different subscriber's modules, a number decoder which decodes its number connecting the associated subscriber's module to the internal time-division multiplex line and that in order to establish a connection between a subscriber's module and a channel module a control arrangement writes the number of the number decoder associated with the subscriber's module into the memory location assigned to this channel module.

2. A switching network as claimed in claim 1, characterized in that the number of memory locations exceeds the number of channel modules, by at least 1, that ech subscriber's module has a call signal output, which is switched by the associated number decoder, that all the call signal outputs are interconnected and connected to the control arrangement via the internal time-division multiplex line, and that the control arrangement writes one after the other the numbers of the subscriber's modules which are not engaged into the memory location to which no channel module has been assigned in several address cycles and tests the internal time-division multiplex line for a call signal when this memory location is read.

3. A switching network as claimed in claim 1 or claim 2, characterized in that the control arrangement writes a number which is not decoded by an available number decoder into the memory locations which are not assigned to a connection.

4. A switching network as claimed in claim 1, characterized in that the addressing device is a cyclic binary counter.

5. A switching network as claimed in claim 1, characterized in that the addressing device applies in each address cycle a clock signal to at least all the subscriber's modules via a clock pulse line to synchronise sampling thereof.

6. A switching network as claimed in claim 4 or claim 5, characterized in that the clock signal is the signal from the most significant output or a transmission signal from the binary counter.

7. A switching network as claimed in claim 5, characterized in that the addressing device interrupts the addressing of the channel modules and of the subscriber's modules at each clock signal for a predetermined period of time.

8. A switching network as claimed in claim 7, characterized in that for an uninterruptedly produced address sequence no channel module is assigned to at least the addresses which follow immediately after the clock signal.

9. A switching network as claimed in claim 8, characterized in that a channel module is also not assigned to the addresses which immediately preceed the clock signal.

* * * * *